United States Patent [19]
Choly

[11] 3,941,064
[45] Mar. 2, 1976

[54] APPARATUS FOR LOADING AND SECURING VEHICLES IN A SHIPPING CONTAINER

[75] Inventor: Mitchell Choly, Troy, Mich.

[73] Assignee: General Motors Corporation, Detroit, Mich.

[22] Filed: Oct. 24, 1974

[21] Appl. No.: 517,441

[52] U.S. Cl.... 105/368 R; 105/368 T; 214/16.1 DB; 214/38 BA; 206/335; 248/119 R
[51] Int. Cl.² B60P 7/08; B61D 45/00; B65D 85/68
[58] Field of Search...... 206/335; 214/38 BA, 38 R, 214/38 BB, 41, 16.1 DB; 105/368 B, 368 R, 368 T; 248/119 R; 220/1.5

[56] References Cited
UNITED STATES PATENTS 3,797,410   3/1974   Blunden.......................... 105/368 R Primary Examiner—William T. Dixson, Jr.
Attorney, Agent, or Firm—Edward J. Biskup

[57] ABSTRACT

Apparatus for loading and securing a vehicle in a shipping container that includes a latch mechanism having a lock member pivotally connected to the container for restraining tie-down devices. The lock member is formed with an actuator lever that is movable between a first position wherein the lock member is in a locked position and a second position wherein the lock member is in an unlocked position. A pusher bar member is provided for loading the vehicle into the container and includes cam means for automatically moving the actuator lever between the locked and unlocked positions.

2 Claims, 8 Drawing Figures

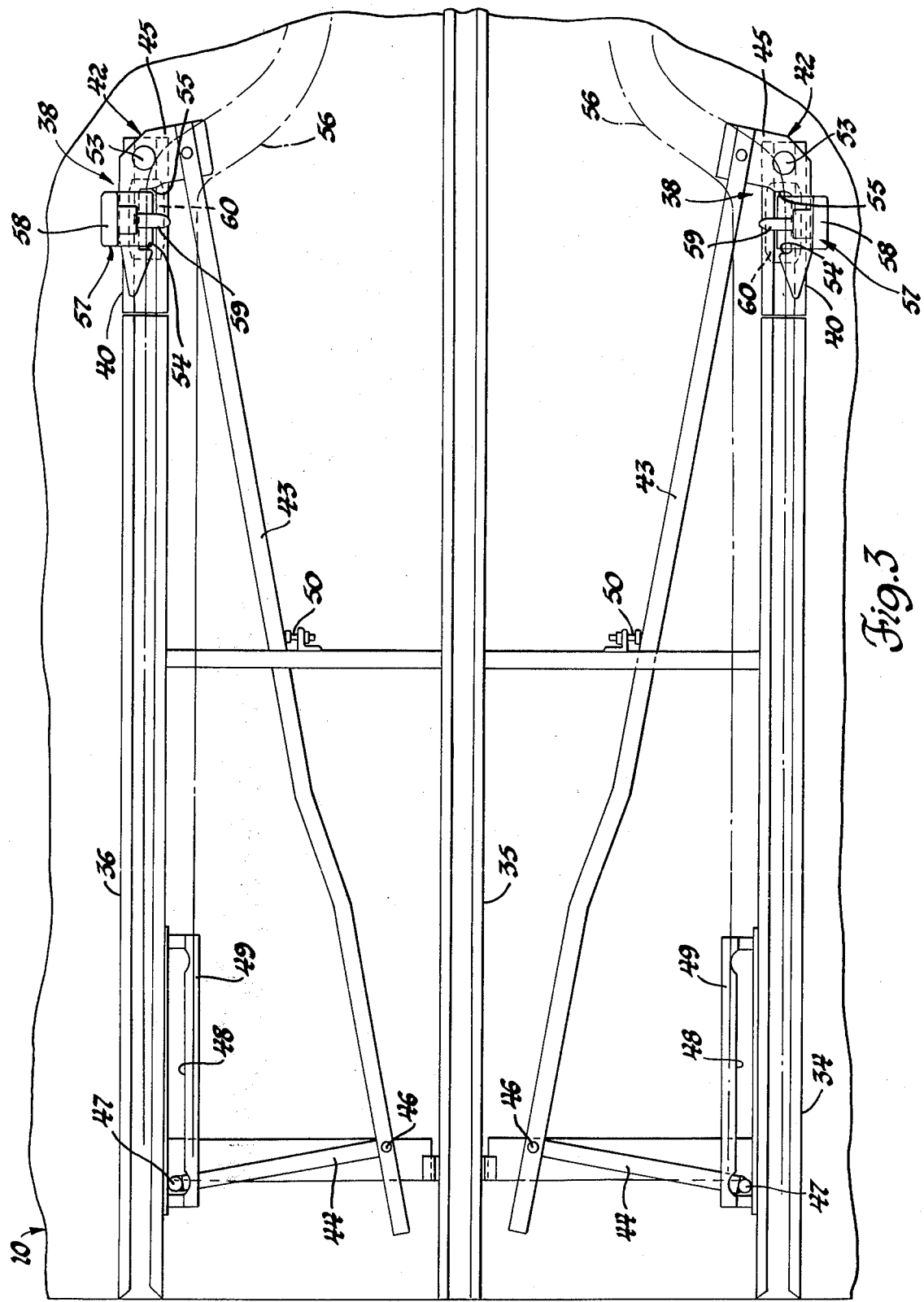

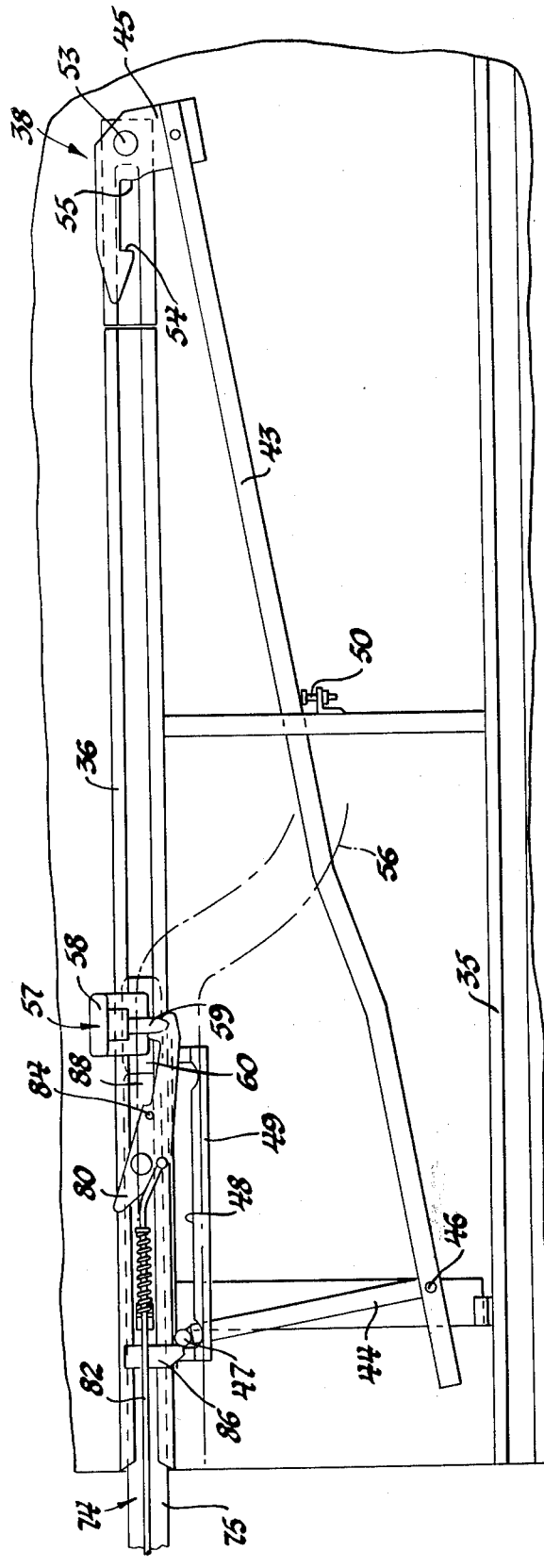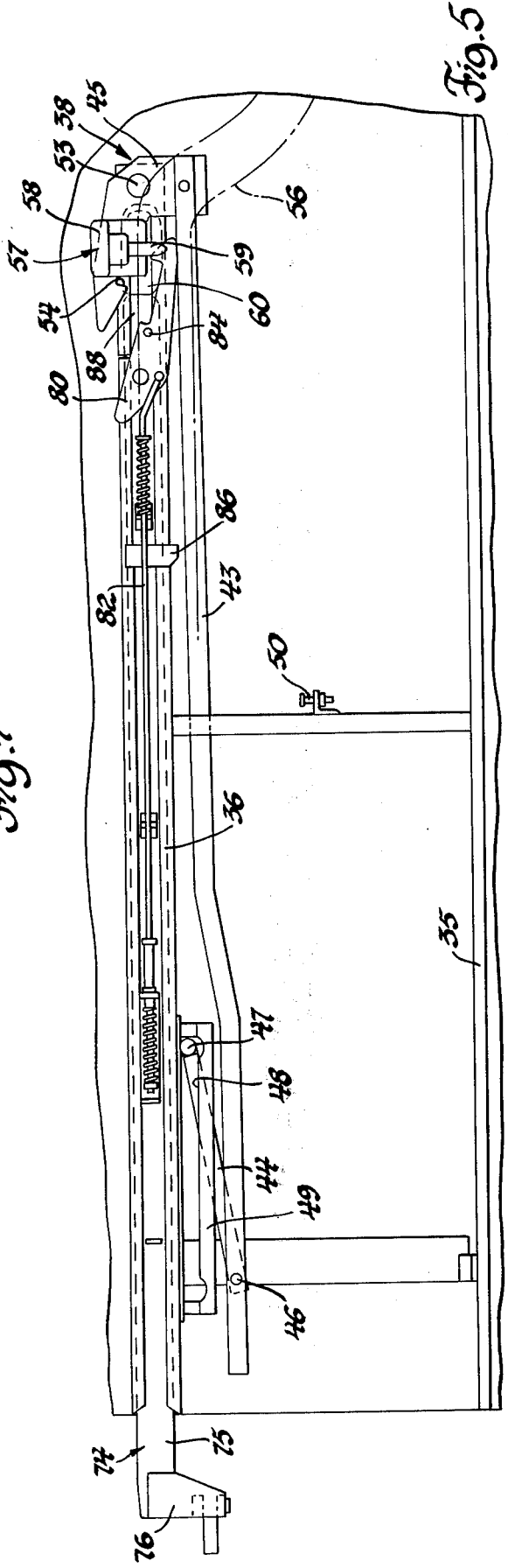

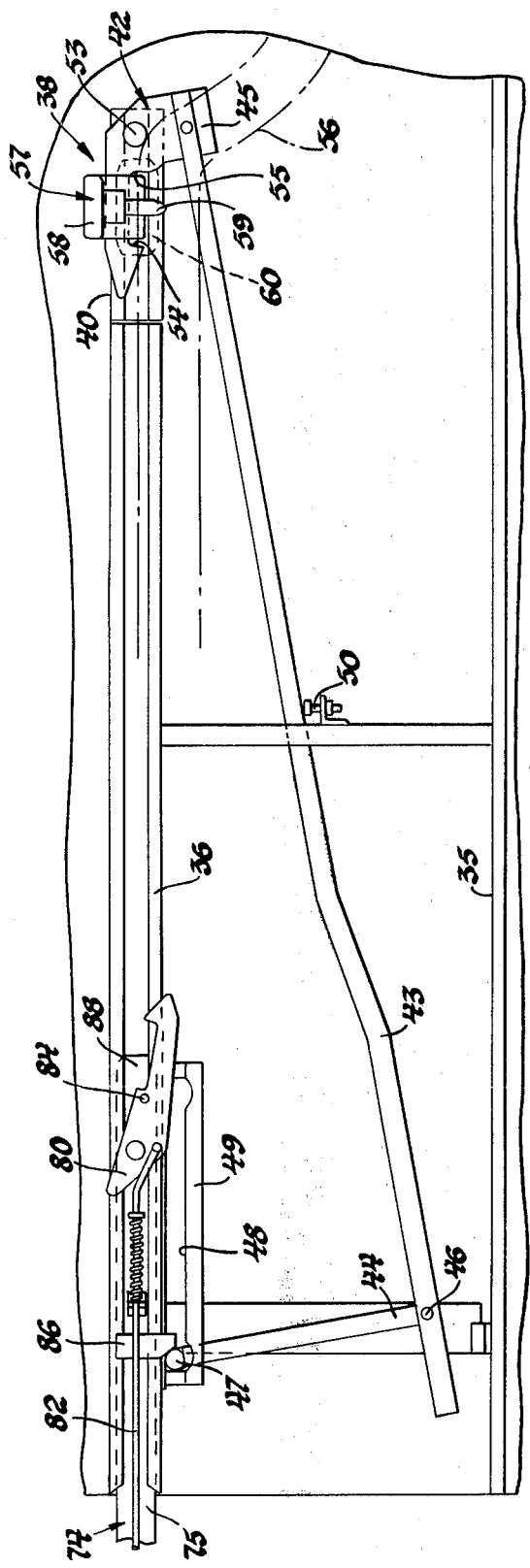

APPARATUS FOR LOADING AND SECURING VEHICLES IN A SHIPPING CONTAINER

One form of closed container that is commonly used for shipping vehicles includes a restraint system which consist of three parallel guide rails that cooperate with and slidably receive three tie-down devices attached to the frame of a vehicle. The outer guide rails incorporate latch mechanisms which, after the vehicle is loaded in the container, are manually operated and serve to trap the associated tie-down devices to prevent them and the connected vehicle from moving in a fore and aft, vertical, or longitudinal direction relative to the transporter. A restraint system of this type can be seen in U.S. Pat. No. 3,739,906 in the name of Cwycyshyn et al and assigned to the assignee of this invention.

The present invention, in general, concerns a restraint system of the above-described type and more particularly an apparatus for loading and automatically securing vehicles within a container that can be transported by railway or highway carriers. In the preferred form, the invention is combined with a vehicle shipping container having a floor portion which includes positioning and restraint means for securing a vehicle thereto. The positioning and restraint means includes two laterally spaced outer guide rails fixed to the floor portion and adapted to slidably receive a pair of tie-down devices attached to the vehicle adjacent the rear end thereof. Each of the guide rails has an outer end that initially receives the tie-down device and also an inner end that has a latch mechanism operatively associated therewith for restraining a tie-down device from movement in a vertical direction and also in a direction along the longitudinal axis of the associated guide rail. The latch mechanism consists of a lock member that is pivotally connected to the container and movable between a locked position for restraining the tie-down device from movement and an unlocked position wherein the tie-down device is free to move. An actuator lever has one end thereof pivotally connected to the lock member and the other end supported by the container for movement along a line adjacent to and parallel to the associated guide rail. The aforesaid other end of the actuator lever is normally located adjacent the outer end of the associate guide rail during which time the lock member is in a locked condition, and is movable towards the inner end of the guide rail so as to cause the lock member to be placed in an unlocked condition. A pair of power extendable pusher bar members are also provided that are adapted to register with and move into the guide rails. Each of the pusher bar members has an outer end for contacting one portion of a tie-down device for loading the vehicle into the container when the pusher bar is moved into the associate guide rail. In addition, a cam is fixed with each of the pusher bar members and serves to engage the aforementioned other end of the actuator lever and cause the latter to be automatically moved from the locked position to the unlocked position when the pusher bar members are inserted into the guide rails during the vehicle loading operation, and also serve to return the actuator lever from the unlocked position to the locked position when the pusher bar members are retracted from the guide rails.

The objects of the present invention are to provide a new and improved apparatus that serves to load and unload vehicles into and out of a shipping container and automatically causes a latch mechanism to lock the vehicle in place during the loading operation and unlock the latch mechanism during the unloading operation; to provide a new and improved latch mechanism for a vehicle tie-down device that is automatically operated by an extendable vehicle loader for initially placing the latch mechanism in an unlocked condition when the vehicle is being moved by the loader into the container and for subsequently placing the latch mechanism in a locked condition when the loader is retracted from the shipping container; and to provide an improved cam-operated latch mechanism for a shipping container that serves to automatically lock and unlock a vehicle tie-down device in position and that is operated by a pusher bar that moves in a rectilinear path for loading and unloading a vehicle into and out of a shipping container.

Other objects and advantages of the present invention will be more apparent from the following detailed description when taken with the drawings in which:

FIG. 3 is a plan view showing a pair of identical latch mechanisms incorporated with the outer guide rails mounted on the upper level of the shipping container shown in FIG. 2 with both latch mechanisms being in a locked condition;

FIG. 4 illustrates one of the latch mechanism of FIG. 3 preparatory to the actuator lever thereof being moved from the locked position to an unlocked position by the pusher bar member associated with the vehicle loader;

FIG. 5 shows the latch mechanism of FIG. 4 in the unlocked position with the pusher bar member fully inserted into the guide rail and the tie-down device being located in a position for locking by the lock member;

FIG. 6 shows the latch mechanism of FIG. 4 having the actuator lever thereof moved to the locked position by the pusher bar member as the latter is being retracted from the guide rail;

FIG. 7 shows the pusher bar member being inserted into the guide rail of FIG. 4 with the vehicle extraction hook positioned for engaging the tie-down device; and FIG. 8 shows the vehicle extraction hook located within an opening in the tie-down device preparatory to withdrawing the latter from the guide rail.

Figure 1:
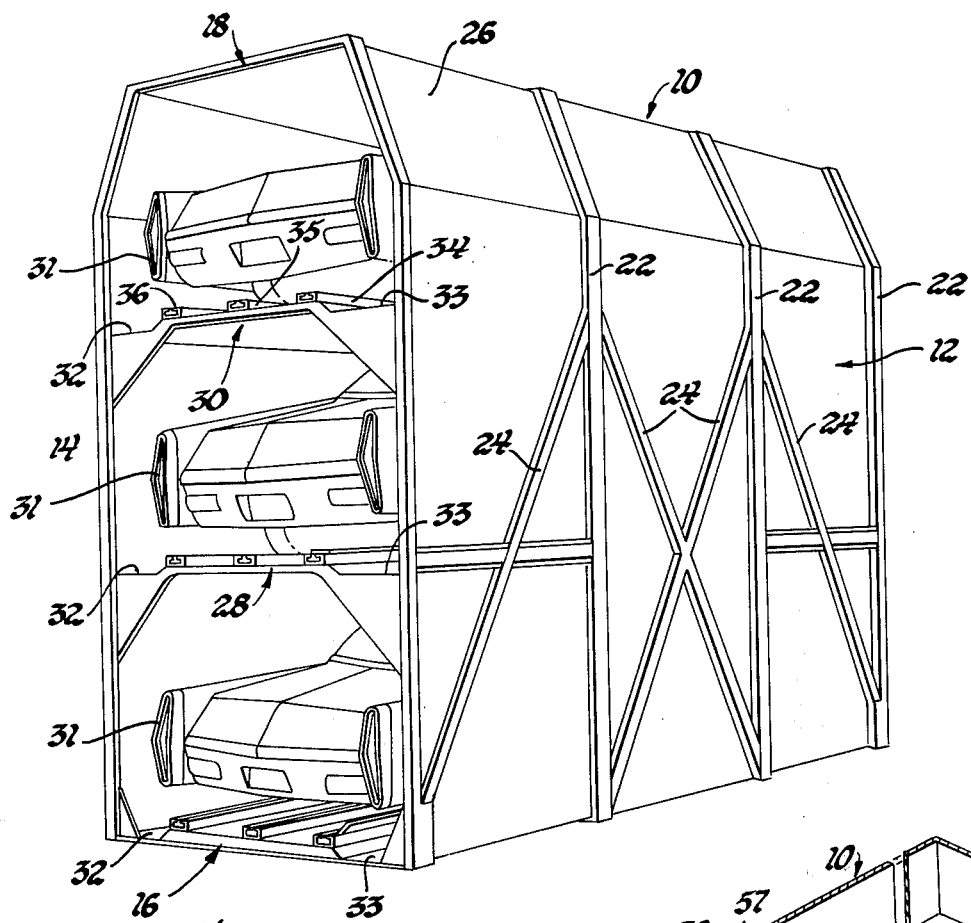
FIG. 1 shows a vehicle shipping container of the type used with the present invention.
Figure 2:
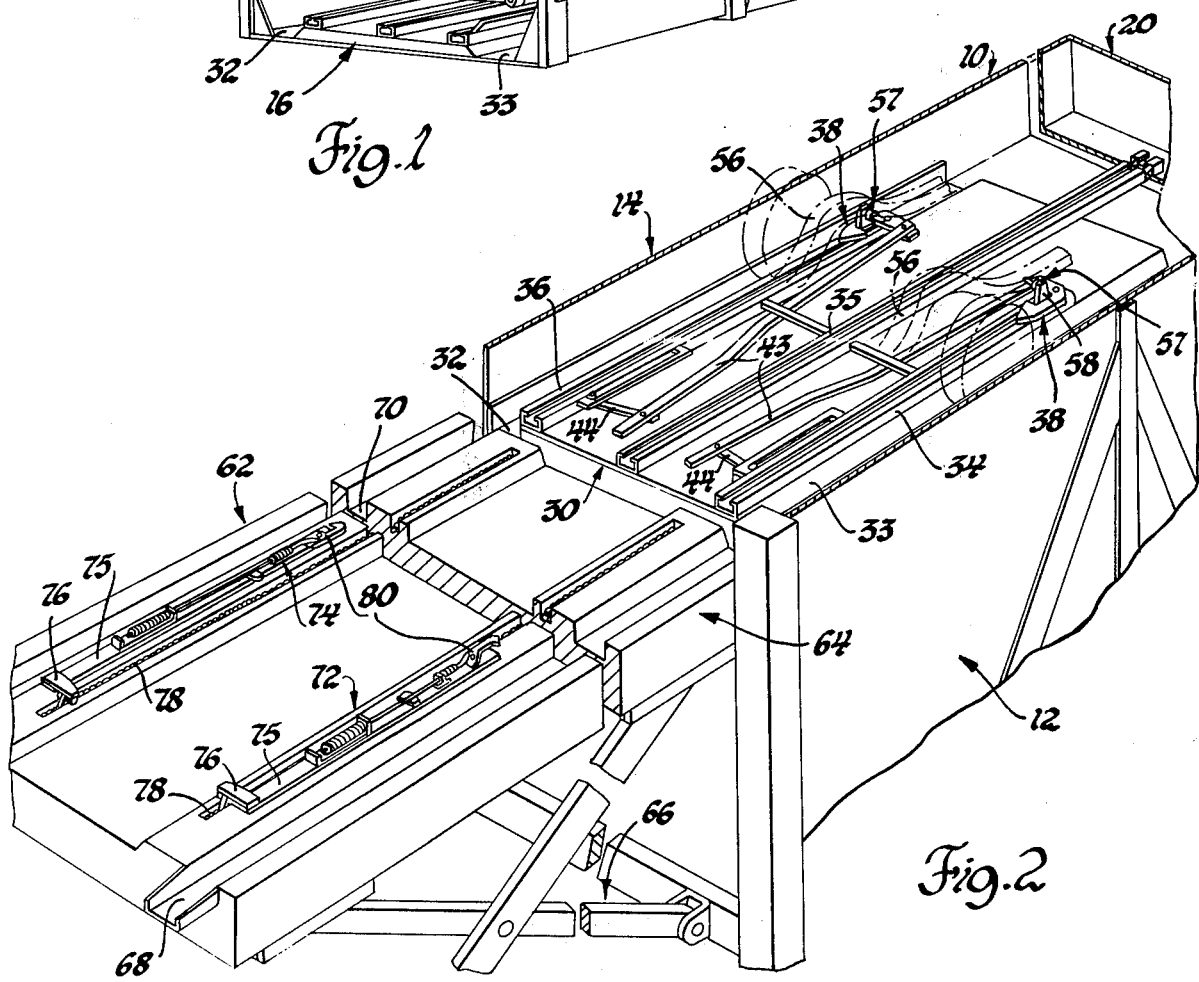
FIG. 2 shows a vehicle loader positioned adjacent an upper level of the shipping container of FIG. 1.

Referring to the drawings and more particularly FIGS. 1 and 2 thereof, a portable shipping container 10 is shown having laterally spaced parallel side walls 12 and 14, a bottom vehicle supporting floor portion 16, a roof portion 18, and an end wall 20. Each side wall 12 and 14 is reinforced by a plurality of vertical and diagonal structural members 22 and 24, respectively, and has an upper inwardly inclined section 26 which connects with the roof portion 18. The shipping container 10 also includes upper floor portions or decks 28 and 30, each of which is also adapted to support a vehicle 31 in a manner as will be hereinafter described. The upper floor portions 28 and 30 are located in horizontal planes parallel to the bottom floor portion 16. Thus, a fully enclosed shipping container is provided with one end only open for receiving cargo which in this case is automotive vehicles. As shown, the shipping container 10 is capable of storing three vehicles, afterwhich the shipping container can be placed on a railway flat car and secured thereto for shipping purposes. Although not shown, the railway flat car would carry four shipping containers of the above-described type placed in longitudinal alignment with the open ends of each pair of shipping containers facing each other so as to completely close each shipping container and thereby fully protect the vehicles from damage of the type which frequently occurs to exposed vehicles.

Each floor portion 16, 28, and 30 is substantially identical in construction and includes a pair of parallel wheel guide tracks 32 and 33 between which are located three elongated parallel guide rails 34, 35 and 36. Each of the guide rails 34, 35 and 36 takes the form of a C-shaped channel and is parallel to the side walls 12 and 14. The center guide rail 35 extends substantially the full length of the shipping container 10, while the outer guide rails 34 and 36 start at the open end of the shipping container and extend forwardly approximately one-third the longitudinal length of the container.

Each outer guide rail 34 and 36 carries a latch mechanism 38 at the inner end thereof which, as seen in FIG. 3, comprises a base 40 that serves as a stop and also a lock member 42 that includes an elongated rod 43 that extends towards the open end of the shipping container 10, an actuator lever 44, and an L-shaped keeper member 45. The rear portion of the rod 43 adjacent the open end of the container is connected to the actuator lever 44 by a pivotal connection 46 while the front portion of the rod is rigid with the keeper member 45. The free end of the actuator lever 44 is formed with an upstanding cylindrical pin 47 which is located in an elongated slot 48 formed in a plate 49 rigidly attached to the associated guide rail. The opposite ends of the slot 48 serve as stop means for the pin 47. Also, the length of the actuator lever 44 is such that when the pin 47 is located in the position shown in FIG. 3, an intermediate portion of the rod 43 contacts a stop 50 fixed to the floor portion and causes the rear portion of the rod at the open end of the container to be flexed away from the associated guide rail. This flexing action together with the location of the pivotal connection 46 on the rod 43 provides an over-center locking arrangement for the actuator 44 when the pin 47 is located in the slot 48 as seen in FIG. 3.

The inner end of the lock member 42 is formed with the L-shaped keeper member 45 which is pivotally mounted to the base 40 by a pivotal connection 53 which permits the lock member 42 to be rotated about a vertical axis between the positions shown in FIGS. 4 and 5. The keeper member 45 is formed with longitudinally spaced stop sections 54 and 55 defined by a U-shaped cutout in the keeper member 45 so when the latter is in the locked position of FIG. 3, it serves to lock a tie-down device in position and prevents it from moving in a fore and aft direction. A keeper member of this type can be seen in copending patent application Ser. No. 414,334, filed on Nov. 9, 1973 and assigned to the assignee of this invention. Thus, the latch mechanism 38 of each guide rail serves to lock the tie-down device attached to the vehicle in place after the vehicle is loaded in the container 10.

In this regard, it will be noted that a frame 56 of the type associated with each of the vehicles 31 is shown in phantom lines in FIGS. 2, 3, 4, 5, 6 and 8. Although only the rear portion of the vehicle frame 56 is shown, it will be understood that the vehicle frame is provided with three tie-down devices, two of which are identical and attached to the rear portion of the frame and constructed as shown in the drawings. The tie-down devices attached to the rear of the vehicle frame 56 can best be seen in FIGS. 2 and 3 and each is identified by the reference numeral 57. Each tie-down device 57 comprises a vertical body portion 58 the upper end of which has a rigid cylindrical mounting member 59 that is located along a horizontal axis and is adapted to be received within an aperture formed in the side of the vehicle frame 56. The lower end of the body portion 58 supports a shoe member 60 having a pair of laterally spaced outwardly extending arms adapted to be received by the guide rail of the container. Tie-down devices of this type can be seen in U.S. Pat. No. 3,794,350 which is assigned to the assignee of this invention.

The center guide rail 35 is adapted to receive a tie-down device (not shown) which is normally attached to the front cross member of the vehicle frame at the center thereof. The lateral spacing of the three tie-down devices on the vehicle frame 56 corresponds with the lateral spacing of the three guide rails 34, 35 and 36 on each floor portion 16, 28, and 30. Accordingly, when a vehicle 31 is rolled into the shipping container 10 with the tires in the tracks 32 and 33, initially the center tie-down device carried by the front cross member of the vehicle enters the center guide rail 35 and, after the vehicle has moved a sufficient distance into the container, the two rear tie-down devices 57 are received by the outer guide rails 34 and 36. The vehicle continues moving into the shipping container 10 until the rear tie-down devices 57 engage the stop (not shown) in the base 40 provided with each outer guide rail 34, 36. At such time, the vehicle 31 is prevented from moving forwardly and assumes the position shown in FIGS. 1 and 2. In this position, the vehicle 31 is restrained from vertical as well as lateral movement and when the lock member 42 of each latch mechanism 38 is moved to the locked positioned shown in FIG. 3, the rear tie-down devices 57 are restrained from longitudinal movement due to the trapping action of the keeper member 45. At such time, the vehicle 31 is completely restrained and the loaded shipping container can be placed on a railway car for shipment to its final destination.

In this instance, loading of the vehicle into each of the three levels of the container 10 is realized with a power loader mechanism 62 supported by four vertical posts two of which only are shown in FIG. 2. The loader mechanism 62 includes a base 64 which has its undersurface connected to a scissors type linkage 66 which through a suitable power-operated drive serves to raise the base 64 from a fully lowered position wherein the base 64 is aligned with floor portion 16 to an intermediate position wherein the base 64 is aligned with floor portion 28, and finally to a fully raised position wherein the base 64 is horizontally aligned with the floor portion 30.

As seen in FIG. 2, the base 64 is in the fully raised position in horizontal alignment with floor portion 30. It will be noted that the base 64 is formed with a pair of parallel wheel guide tracks 68 and 70 which register with the guide tracks 32 and 33 formed with each of the floor portions 16, 28 and 30. In addition, a pair of identical pusher bar members 72 and 74 are supported on the upper surface of the base 64 between the guide tracks 68 and 70. Each of the pusher bar members 72 and 74 includes an elongated bar 75. The bars 75 associated with the respective pusher bar members register with the outer guide rails 34 and 36, and each of the bars 75 has the rear end 76 thereof movable through a power driven chain 78 into the aligned guide rail. A pivoted vehicle extraction hook 80 is mounted adjacent the front end 88 of each bar 75 and is adapted to be positioned through a spring biased rod 82 and a removable dowel 84 in a vehicle loading position shown in FIG. 4 and a vehicle unloading position shown in FIG. 7. It will be noted that, as seen in FIG. 4, the hook 80 is mounted at the front end of the bar 75 in a manner so when the pusher bar member is inserted into the associated guide rail, the bar 75 moves into the center of the guide rail while the hook 80 is located above the guide rail. The bar 75, in each case, is also formed with a cam 86 which is normally located above the guide rail and extends laterally outwardly from the bar for purposes which will be hereinafter explained.

During the vehicle loading operation, the latch mechanism 38 will normally be in the locked position of FIG. 4 and initially both of the pusher bar members 72 and 74 have the rear end 76 of the bar 75 retracted and located adjacent the rear end of the base 64. A vehicle 31 is then driven along guide tracks 68 and 70 onto the base 64 at which time the center tie-down device may be attached to the cross frame member. The rear tie-down devices 57 are then connected to the rear portions of the vehicle frame 56 so that the shoe portion 60 of the tie-down device is located just ahead of and in contact with the front end 88 of the bar 75. Both chains 78 associated with the push bar members 72 and 74 are driven through a common drive and, accordingly, when the latter drive is actuated, the push bar members will drive the shoe member 60 of each tie-down device 57 forwardly and move the vehicle 31 into the container 10. As aforementioned, when the vehicle 31 moves forwardly into the container, the center tie-down device will enter the guide rail 35 initially and afterwards the rear tie-down devices 57 will enter the guide rails 34 and 36. The push bar members 72 and 74 will continue to move the vehicle 31 into the container causing the bar 75 to be inserted into the associated guide rail with the hook 80 located above the guide rail as seen in FIG. 4. As the bar 75 continues to move forwardly, the cam 86 will engage the pin 47 of the actuator lever 44 and cause the latter to move within the guide slot 48 from the position shown in FIG. 4 to that shown in FIG. 5. This movement of the actuator lever 44 causes the rod 43 of the lock member 42 to move towards the associated guide rail and thereby pivot the keeper member 45 clockwise as seen in FIG. 4 to the position shown in FIG. 5. At such time, the latch mechanism 38 is in an unlocked condition. The bar 75 will then continue to move the tie-down device 57 and, accordingly, the vehicle 31 into the container 10 until the tie-down device 57 contacts the stop associated with the base 40. The vehicle 31 is then fully inserted into the container 10, and movement of each of the pusher bar members 72 and 74 is then reversed in direction so as to cause them to be retracted from the guide rails. During the retracting movement of each push bar members 72 and 74, the cam 86 once again engages the pin 47 of the actuator lever 44 and causes the latter to rotate counter-clockwise about pivotal connection 46 from the position shown in FIG. 5 to that shown in FIG. 6 so as to return the lock member 42 to its initial locked position. In this instance, this movement causes the keeper member 45 of each latch mechanism 38 to trap the tie-down device 57 and prevent it from moving in a longitudinal direction. Thus, the vehicle 31 is loaded into the container 10, the latch mechanism 38 is automatically unlocked, and afterwards automatically locked to restrain the vehicle from movement.

FIGS. 7 and 8 show the dowel 84 removed from the hook 80 so the latter is positioned for retracting the vehicle 31 from the container. Thus, with the base 64 of the power loader mechanism 62 located in horizontal alignment with one of the floor portions as seen in FIG. 2, the chain drive motor is actuated causing the pusher bar members 72 and 74 to move within the associated outer guide rails and, as during the loading operation, the cam 80 engages the pin 47 of the actuator lever 44 and moves it from the full line position to the phantom line position as shown in FIG. 7. Each push bar member 72 and 74 proceeds to move inwardly causing the tapered nose of the hook 80 to contact the tapered surface on the free end of the keeper member 45. This causes the hook 80 to be cammed clockwise against the bias of the springs associated with the rod 82 and then moved counter-clockwise by the latter mentioned springs into an aperture formed in the side of the tie-down device 57 as shown in FIG. 8. Afterwards, movement of the push bar members 72 and 74 is reversed in direction so as to withdraw the tie-down devices 57 and, accordingly, the vehicle 31 from the container 10 onto the loader mechanism 64.

Although not shown, it will be understood that a suitable guideway is provided on the base 64 for the bar 75 so as to assure that the front end 88 of the bar will move into the aligned guide rail attached to the floor portion of the container 10.

Various changes and modifications can be made in this construction without departing from the spirit of the invention. Such changes and modifications are contemplated by the inventor and he does not wish to be limited except by the scope of the appended claims.

I claim:

1. In combination with a container for shipping vehicles, said container having a floor portion including positioning and restraint means for securing a vehicle thereto, said positioning and restraint means including two laterally spaced guide rails fixed to said floor portion and adapted to slidably receive a pair of tie-down devices attached to said vehicle adjacent the rear end thereof, each of said guide rails having an outer end which initially receives the tie-down device and an inner end, a latch mechanism operatively associated with the inner end of each of said guide rails for restraining said pair of tie-down devices from movement in a vertical direction and along the longitudinal axis of said each of the guide rails, said latch mechanism comprising a lock member pivotally connected to said container for movement between a locked position for restraining the tie-down device and an unlocked position wherein said tie-down device is unrestrained, means for moving said lock member between the locked and unlocked positions, said latter mentioned means including an actuator lever having one end pivotally supported by the lock member and the other end supported by the container for movement along a line located adjacent to and parallel to the associated guide rail, said other end of the actuator lever being normally located adjacent the outer end of the associated guide rail in a first position wherein said lock member is located in the locked position and being movable towards the inner end of the guide rail to a second position wherein said lock member is located in the unlocked position, a vehicle loader mechanism having a base adapted to be located in horizontal alignment with said floor portion, a pair of power extendable elongated pusher bar members carried by said loader mechanism and adapted to register with and move into said pair of guide rails, each of said pusher bar members having an outer end for contacting one portion of a tie-down device for loading said vehicle into the container when the pusher bar is moved into the associated guide rail, and a cam fixed with each of said pusher bar members for engaging said other end of said actuator lever and moving the latter from the first position to the second position when the pusher bar members are inserted into the guide rails for loading the vehicle into the container and for engaging said other end of said actuator lever and returning the latter from the second position to the first position when the pusher bar members are retracted from the guide rails so as to automatically lock said tie-down devices to said container.

2. In combination with a container for shipping vehicles, said container having a floor portion including positioning and restraint means for securing a vehicle thereto, said positioning and restraint means including two laterally spaced parallel guide rails fixed to said floor portion and adapted to slidably receive a pair of tie-down devices attached to said vehicle adjacent the rear end thereof, each of said guide rails having an inner end and an outer end, a latch mechanism operatively associated with the inner end of each of said guide rails for restraining said pair of tie-down devices from movement in a vertical direction and along the longitudinal axis of said each of the guide rails, said latch mechanism comprising a lock member pivotally connected to said container for movement between a locked position for restraining the tie-down device and an unlocked position wherein said tie-down device is unrestrained, means for moving said lock member between the locked and unlocked positions, said latter mentioned means including an actuator lever having one end pivotally supported by the lock member, a guide plate mounted to the container and having a guide slot for supporting the other end the actuator lever for movement along a line located adjacent to and parallel to the associated guide rail, said guide plate having first stop means for normally locating said other end of the actuator lever adjacent the outer end of the associated guide rail in a first position wherein said lock member is located in the locked position, second stop means formed with the guide plate for limiting movement of the other end of the actuator bar towards the inner end of the guide rail wherein the actuator lever is located in a second position and said lock member is located in the unlocked position, a vehicle loader mechanism having a base adapted to be located in horizontal alignment with said floor portion, a pair of power extendable elongated pusher bar members carried by said loader mechanism and adapted to register with and move into said pair of guide rails, each of said pusher bar members having an outer end for contacting one portion of a tie-down device for loading said vehicle into the container when the pusher bar member is moved into the associated guide rail, and a cam fixed with each of said pusher bar members and extending laterally outwardly therefrom for engaging said other end of said actuator lever and moving the latter from the first position to the second position when the pusher bar members are inserted into the guide rails for loading the vehicle into the container and for engaging said other end of said actuator lever and returning the latter from the second position to the first position when the pusher bar members are retracted from the guide rails so as to automatically lock said tie-down devices to said container.

* * * * *